United States Patent
Nitta et al.

[11] Patent Number: 6,144,474
[45] Date of Patent: Nov. 7, 2000

[54] OPTICAL TRANSMISSION SYSTEM INCLUDING OPTICAL REPEATERS WITH SELECTIVELY ENABLED GAIN EQUALIZERS CONTAINED THEREIN AND INCLUDING AN ADD/DROP APPARATUS WITH A PLURALITY OF INDIVIDUALLY SELECTABLE FILTERS

[75] Inventors: Mitsushi Nitta, Kawasaki; Shinichirou Harasawa, Hachioji; Hiroshi Nakashima, Kawasaki, all of Japan

[73] Assignee: Fujitsu Limited, Kawasaki, Japan

[21] Appl. No.: 08/949,690

[22] Filed: Oct. 14, 1997

[30] Foreign Application Priority Data

Oct. 21, 1996 [JP] Japan ................................. 8-278278
Mar. 19, 1997 [JP] Japan ................................. 9-066916

[51] Int. Cl.[7] ...................................................... H04B 10/16
[52] U.S. Cl. .............................. 359/179; 359/161; 359/180
[58] Field of Search ..................................... 359/173, 180, 359/181

[56] References Cited

U.S. PATENT DOCUMENTS

| | | | |
|---|---|---|---|
| 5,225,922 | 7/1993 | Chraplyvy et al. | 359/124 |
| 5,675,429 | 10/1997 | Henmi et al. | 359/179 |
| 5,815,299 | 7/1993 | Bayart et al. | 359/171 |

OTHER PUBLICATIONS

Toba et al, "A 100–Channel Optical FDM Six–Stage In–Line Amplifier System Employing Tunable Gain Equalizers", IEEE, abstract and p. 249, Feb. 1993.

*Primary Examiner*—Leslie Pascal
*Assistant Examiner*—Hanh Phan
*Attorney, Agent, or Firm*—Staas & Halsey, LLP

[57] ABSTRACT

An optical transmission system including a plurality of optical repeaters arranged along a transmission line. A respective gain equalizer is arranged along the transmission line after an integer number of optical repeaters. Further, each optical repeater can include an optical amplifier, a gain equalizer and a connection mechanism. The connection mechanism has a first state and a second state so that (a) when the connection mechanism is in the first state, the gain equalizer of the optical repeater performs an equalization process on the light signal, and (b) when the connection mechanism is in the second state, the gain equalizer of the optical repeater does not perform an equalization process on the light signal. An add/drop apparatus is also provided for adding/dropping an individual wavelength signal from a wavelength division multiplexed (WDM) signal travelling through the optical communication system. The add/drop apparatus includes a plurality of filters, and a selection mechanism. Each filter affects a different wavelength. The plurality of filters includes at least one filter affecting a wavelength corresponding to a wavelength signal in the WDM signal. The selection mechanism selects a respective filter of the at least one filter to allow the apparatus to add/drop the wavelength signal in the WDM signal corresponding to the wavelength of the selected filter.

8 Claims, 13 Drawing Sheets

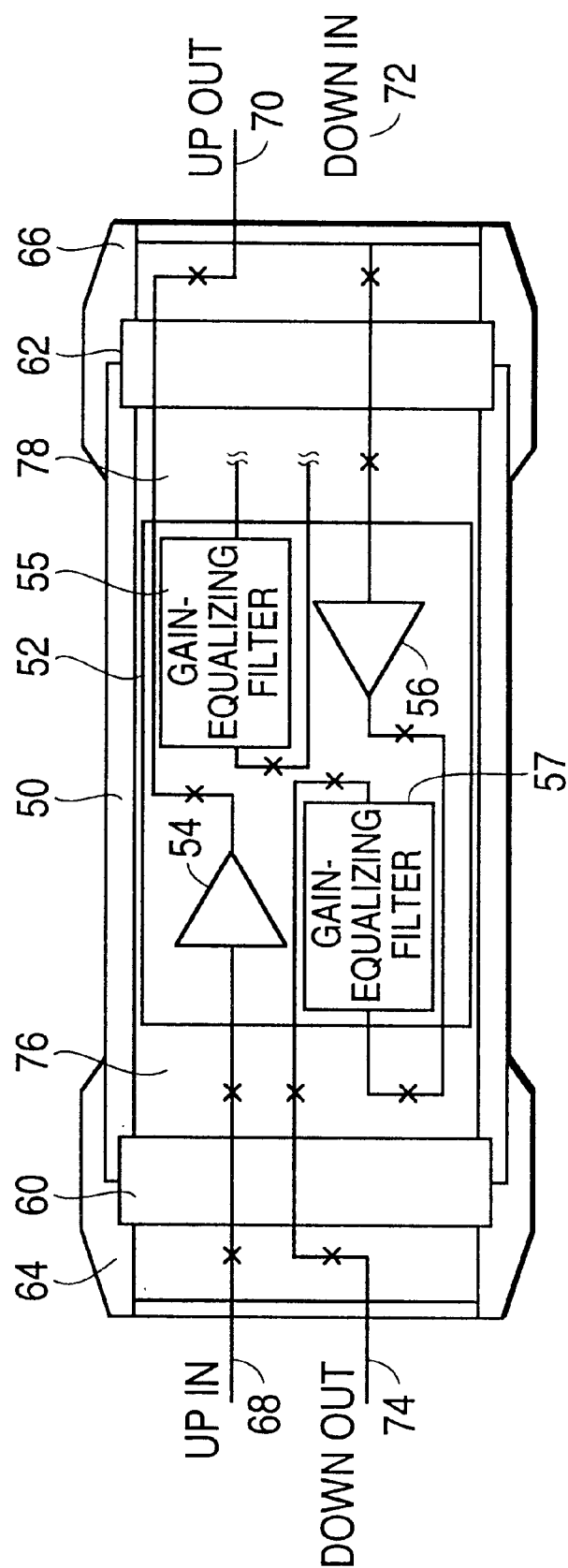

OPTICAL TRANSMISSION SYSTEM INCLUDING OPTICAL REPEATERS WITH SELECTIVELY ENABLED GAIN EQUALIZERS CONTAINED THEREIN AND INCLUDING AN ADD/DROP APPARATUS WITH A PLURALITY OF INDIVIDUALLY SELECTABLE FILTERS

CROSS-REFERENCE TO RELATED APPLICATIONS

This application is based on, and claims priority to, Japanese application numbers 08-278278 and 09-066916, filed Oct. 21, 1996, and Mar. 19, 1997, respectively, in Japan, and which are incorporated herein by reference.

BACKGROUND OF THE INVENTION

1. Field of the Invention

The present invention relates to an optical transmission system for transmitting wavelength division multiplexed (WDM) signals. More specifically, the present invention relates to an optical transmission system having optical repeaters arranged along a transmission line, where each optical repeater has a gain equalizer that can be selectively enabled or disabled.

The present invention also relates to an optical transmission system having an add/drop apparatus with a plurality of individually selectable filters for adding/dropping individual wavelength signals from a WDM signal.

2. Description of the Related Art

Conventional optical transmission systems transmit optical signals along an optical fiber transmission line. Erbium-doped fiber amplifiers are typically arranged along the transmission line to amplify the optical signals.

FIG. 1 is a graph illustrating the wavelength versus power output of a typical erbium-doped fiber amplifier (EDFA). Referring now to FIG. 1, an EDFA has gain peaks at wavelengths of approximately 1533 nm and 1558.5 nm, due to the emission and absorption characteristics of erbium. Therefore, in underwater, or submarine, optical transmission systems, an EDFA is typically used for the transmission of signals with a wavelength of 1558.5 nm.

FIG. 2 is a graph illustrating the gain versus wavelength relationship of an EDFA near the gain peak of 1558.8 nm. Referring now to FIG. 2, an EDFA has a single-peak characteristic curve with a bell shape centered around a gain peak at the wavelength of 1558.8 nm.

Referring again to FIG. 1, the curve is relatively flat over a specific wavelength range. As a result, wavelengths in this range will experience relatively equal gain when a single EDFA is used. However, when optical signals are transmitted over long distances (for example, approximately 5000 km) and thereby travel through many EDFAs or repeaters (for example, approximately 70 EDFAs or repeaters), wavelength-gain relationships of each EDFA are accumulated due to the self-filtering effect of an EDFA. As a result, the total characteristic curve is represented by a steep curve.

For example, FIG. 3 is a graph illustrating the wavelength versus power level caused by the cumulative characteristics of a plurality of EDFAS. Referring now to FIG. 3, the curve is relatively steep, and can be contrasted to the relatively flat curve in FIG. 1.

The step curve in FIG. 3 causes many problems in transmission systems using wavelength division multiplexing (WDM), since different wavelengths experience a significantly different effect.

For example, FIG. 4 is a diagram illustrating the wavelength versus power level caused by the cumulative characteristics of a plurality of EDFAs, for a WDM signal having eight wavelength signals multiplexed together. Referring now to FIG. 4, the optical signal-to-noise ratio (SNR) of the WDM signal greatly deteriorates because of the self-filtering effect for wavelengths $\lambda 1$ and $\lambda 8$, which are far from the wavelength having the peak gain. This deterioration is so serious that signal transmission is virtually impossible.

SUMMARY OF THE INVENTION

Accordingly, it is an object of the present invention to provide an optical transmission system that can transmit a WDM signal without deterioration of the optical SNR, and that minimizes the required number of spare optical repeaters.

It is an additional object of the present invention to reduce the cost required for installing and configuring optical equipment, including optical repeaters and add/drop apparatuses, in a WDM optical transmission system.

It is a further object of the present invention to provide an add/drop apparatus which can be configured to add/drop different wavelength signals in a WDM signal.

Additional objects and advantages of the invention will be set forth in part in the description which follows, and, in part, will be obvious from the description, or may be learned by practice of the invention.

Objects of the present invention are achieved by providing an optical transmission system which includes a plurality of optical repeaters arranged along a transmission line. A plurality of gain equalizers are also arranged along the transmission line. Each gain equalizer is arranged along the transmission line after an integer number of optical repeaters, and equalizes the gain of upstream optical repeaters.

Objects of the present invention are also achieved by providing an optical repeater which includes an optical amplifier, a gain equalizer and a connection mechanism. The connection mechanism has a first state and a second state so that (a) when the connection mechanism is in the first state, the gain equalizer of the optical repeater performs an equalization process on the light signal, and (b) when the connection mechanism is in the second state, the gain equalizer of the optical repeater does not perform an equalization process on the light signal.

Moreover, objects of the present invention are achieved by providing a apparatus for adding/dropping an individual wavelength signal from a wavelength division multiplexed (WDM) signal. The apparatus includes a plurality of filters, and a selection mechanism. Each filter affects a different wavelength. The plurality of filters includes at least one filter affecting a wavelength corresponding to a wavelength signal in the WDM signal. The selection mechanism selects a respective filter of the at least one filter to allow the apparatus to add/drop the wavelength signal in the WDM signal corresponding to the wavelength of the selected filter.

In addition, objects of the present invention are achieved by providing an apparatus for dropping a wavelength signal from a WDM signal. The apparatus includes a plurality of filters and a selection mechanism. The plurality of filters each affect a different wavelength, and include at least one filter affecting a wavelength corresponding to a wavelength signal in the WDM signal. The selection mechanism selects a respective filter of the at least one filter to allow the apparatus to drop the wavelength signal in the WDM signal corresponding to the wavelength of the selected filter.

Objects of the present invention are also achieved by providing an apparatus for adding a wavelength signal to WDM signal. The apparatus includes a plurality of filters and a selection mechanism. The plurality of filters each affect a different wavelength, and include a filter affecting a wavelength corresponding to the wavelength signal to be added to the WDM signal. The selection mechanism selects the filter that affects the wavelength corresponding to the wavelength signal to be added, to allow the apparatus to add the wavelength signal to the WDM signal.

BRIEF DESCRIPTION OF THE DRAWINGS

These and other objects and advantages of the invention will become apparent and more readily appreciated from the following description of the preferred embodiments, taken in conjunction with the accompanying drawings of which:

FIG. 10 is a diagram illustrating an optical amplifier-repeater, according to an embodiment of the present invention.

DESCRIPTION OF THE PREFERRED EMBODIMENTS

Figure 1:
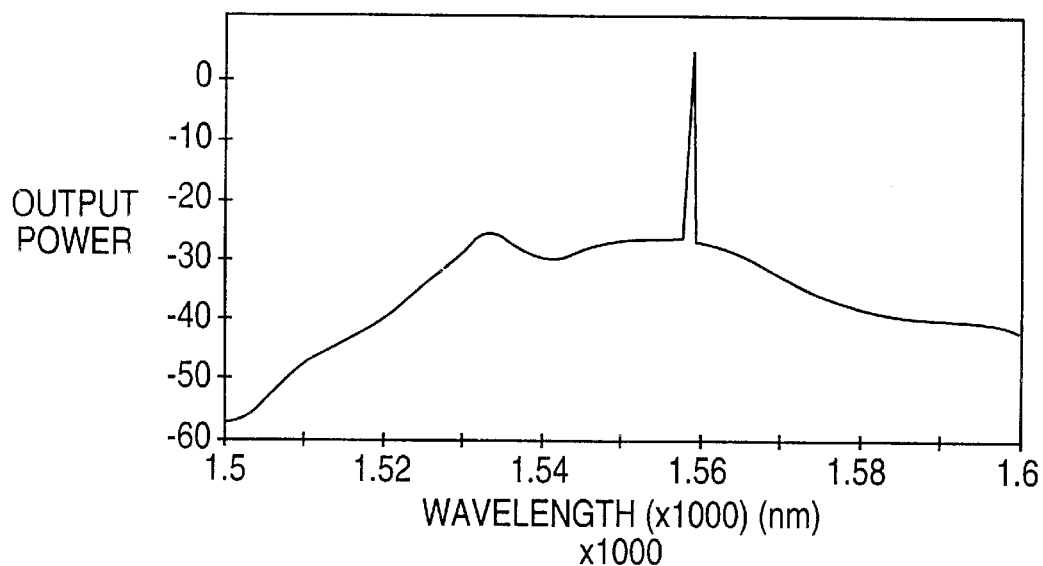
FIG. 1 is a graph illustrating the wavelength versus power output level of a typical EDFA.
Figure 2:
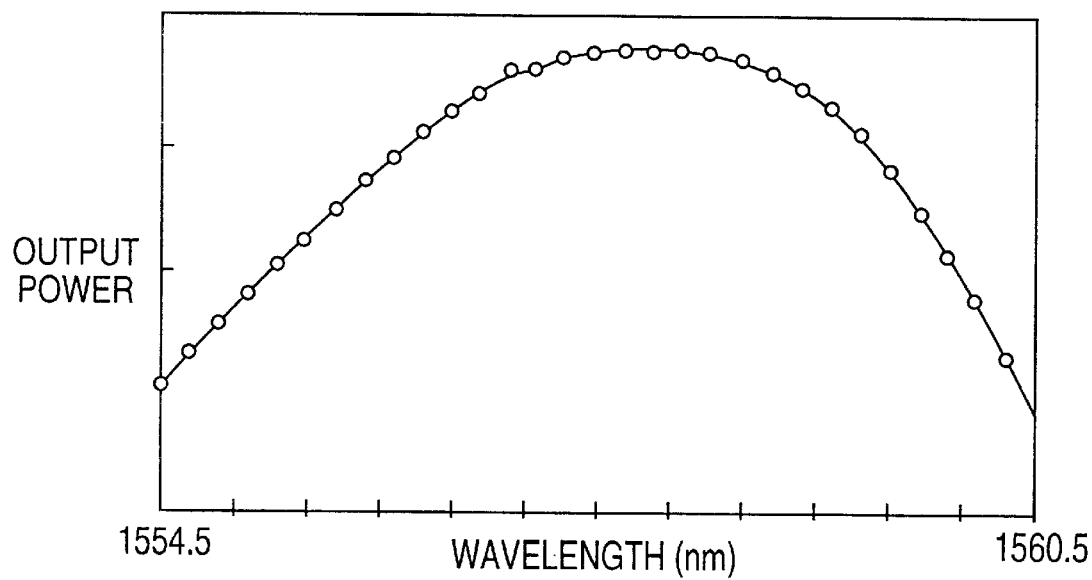
FIG. 2 is a graph illustrating the gain versus wavelength relationship of an EDFA near the gain peak of 1558.8 nm.
Figure 3:
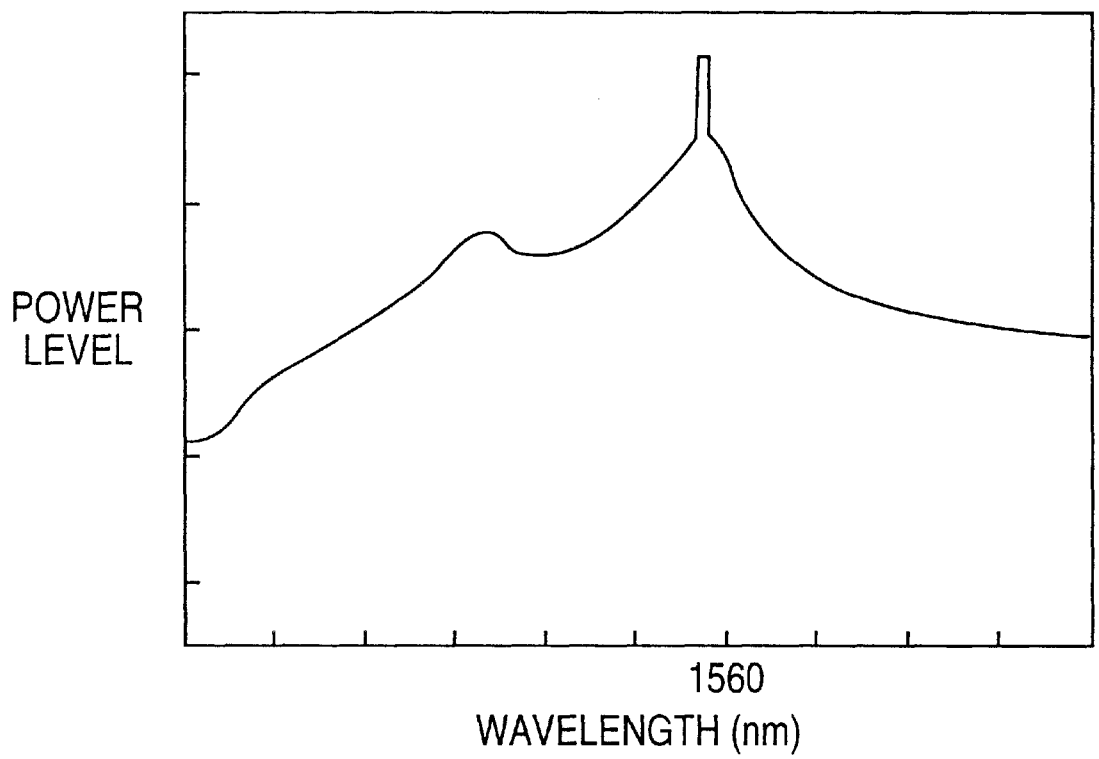
FIG. 3 is a graph illustrating the wavelength versus power level caused by the cumulative characteristics of a plurality of EDFAs.

Reference will now be made in detail to the present preferred embodiments of the present invention, examples of which are illustrated in the accompanying drawings, wherein like reference numerals refer to like elements throughout.

Figure 5:
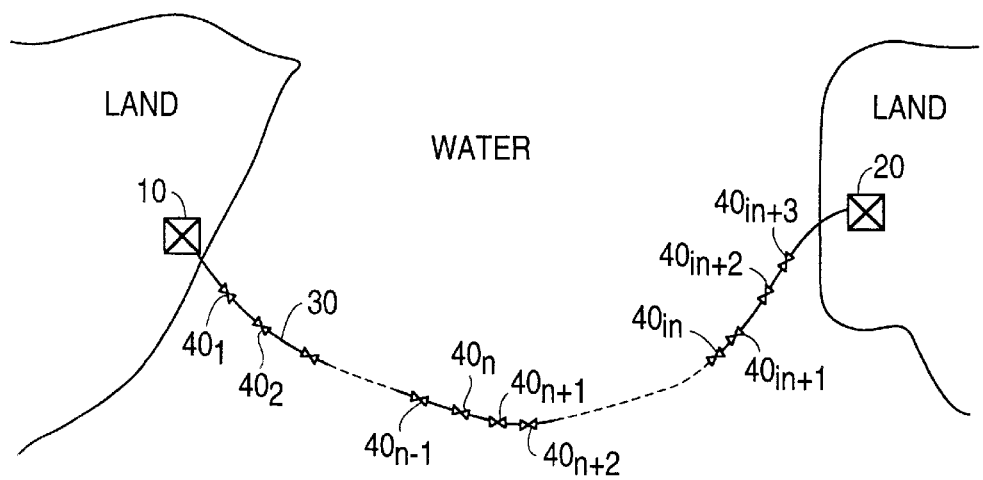
FIG. 5 is a diagram of an optical submarine transmission system, according to an embodiment of the present invention.

FIG. 5 is a diagram of an optical submarine transmission system, according to an embodiment of the present invention. Referring now to FIG. 5, ground base stations 10 and 20 are interconnected by an optical fiber cable 30. Optical amplifier-repeaters $40_1$ to $40_{(in+3)}$ are spaced along optical fiber cable 30 at nearly equal intervals, where i and n are positive integers. Of optical amplifier-repeaters $40_1$ to $40_{(in+3)}$, optical amplifier-repeaters $40_{(n)}$, $40_{(2n)}$, ..., $40_{(in)}$ have built-in gain-equalizing filters (not illustrated). Some or all of the other optical amplifier-repeaters $40_1$ to $40_{(n-1)}$, $40_{(n+1)}$, $40_{(n+2)}$, and $40_{(in+1)}$ to $40_{(in+3)}$ do not have a built-in gain-equalizing filter. Each optical amplifier-repeaters $40_1$ to $40_{(in+3)}$ includes an erbium-doped fiber amplifier (EDFA) (not illustrated) for amplification of optical signals.

Since a single EDFA has a flat wavelength-gain curve (as in FIG. 1), it is difficult to fabricate a gain-equalizing filter that matches this characteristic. Moreover, if a gain-equalizing filter were incorporated in each of optical amplifier-repeaters $40_1$ to $40_{(in+3)}$, the cost of the overall optical transmission system would be extremely high.

Therefore, according to embodiments of the present invention, gain-equalizing filters are provided within every n (for example, every ten) amplifier-repeaters. These amplifier-repeaters provided with gain-equalizing filters are denoted by $40_{(n)}$, $40_{(2n)}$, and $40_{(in)}$.

Therefore, according to embodiments of the present invention as illustrated, for example, in FIG. 5, an optical transmission system includes a plurality of optical repeaters arranged along a transmission line. A plurality of gain equalizers are also arranged along the transmission line. Each gain equalizer is arranged along the transmission line after an integer number of optical repeaters, and equalizes the gain of upstream optical repeaters.

Figure 6:
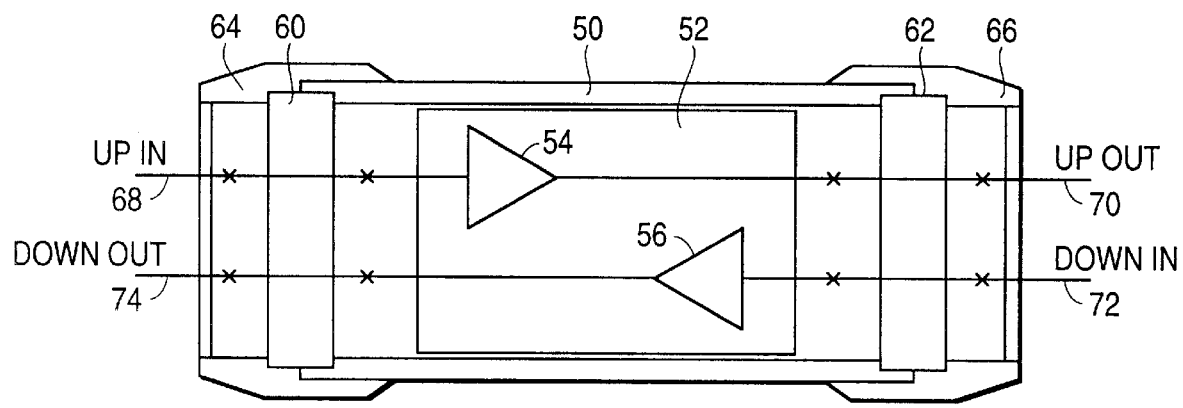
FIG. 6 is a diagram illustrating a cross-section of an optical amplifier-repeater that does not perform a gain-equalizing process, according to an embodiment of the present invention.

FIG. 6 is a diagram illustrating a cross-section of an optical amplifier-repeater 401 that does not have a gain-equalizing filter, according to an embodiment of the present invention. Referring now to FIG. 6, a cylinder houses an internal unit 52. Internal unit 52 includes EDFAs 54 and 56. Cylinder 50 is sealed with cover assemblies 60 and 62, which are fitted into the ends of cylinder 50. Further, the ends of cylinder 50 are furnished with joint rings 64 and 66 that cover the cover assemblies 60 and 62.

An optical signal travelling through an optical fiber 68 is amplified by EDFA 54 and then output to an optical fiber 70. An optical signal travelling through optical fiber 72 is amplified by EDFA 56 and then output to optical fiber 74. An "X" mark on optical fibers 68, 70, 72, and 74 denotes a splice.

Figure 7:
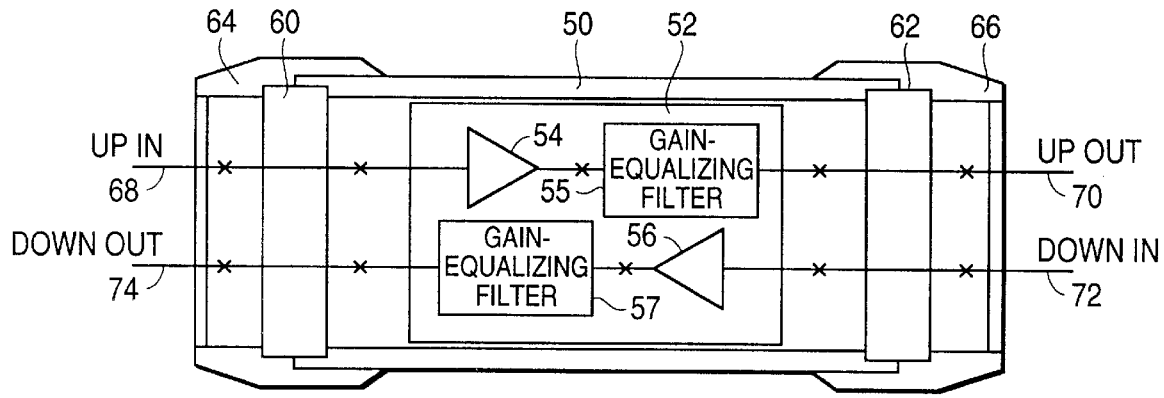
FIG. 7 is a diagram illustrating a cross-section of an optical amplifier-repeater having gain-equalizing filters, according to an embodiment of the present invention.

FIG. 7 is a diagram illustrating a cross-section of an optical amplifier-repeater (such as optical amplifier-repeater 40(n)) having gain-equalizing filters, according to an embodiment of the present invention. Referring now to FIG. 7, internal unit 52 is contained in cylinder 50. Internal unit 52 includes optical circuits including EDFAs 54 and 56 and gain-equalizing filters 55 and 57. Cylinder 50 is sealed with cover assemblies 60 and 62, which are fitted into both ends of the cylinder 50. Further, the ends of cylinder 50 are furnished with joint rings 64 and 66 that cover the cover assemblies 60 and 62.

An optical signal travelling through optical fiber 68 is amplified by EDFA 54, equalized by gain-equalizing filter 55 and then output to optical fiber 70. An optical signal travelling through optical fiber 72 is amplified by EDFA 56, equalized by gain-equalizing filter 57 and then output to optical fiber 74. The "X" mark on the optical fibers 68, 70, 72, and 74 denotes a splice.

Figure 8:
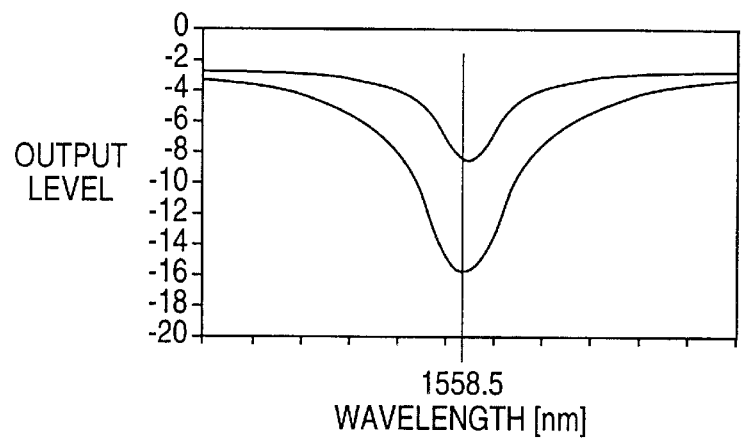
FIG. 8 is a graph illustrating a characteristic curve of gain-equalizing filters, according to an embodiment of the present invention.

FIG. 8 is a graph illustrating a characteristic curve of gain-equalizing filters 55 and 57, according to an embodiment of the present invention. Referring now to FIG. 8, gain-equalizing filters 55 and 57 each have a notch-shaped characteristic curve having an attenuation valley at a wavelength of approximately 1558.5 nm. This characteristic curve is opposite that of the combination of n EDFAs connected in series.

Figure 4:
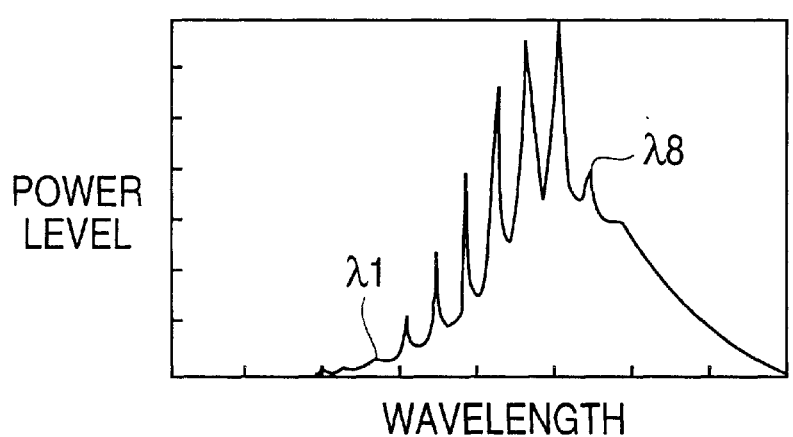
FIG. 4 is a diagram illustrating the wavelength versus power level caused by the cumulative characteristics of a plurality of EDFAs.
Figure 9:
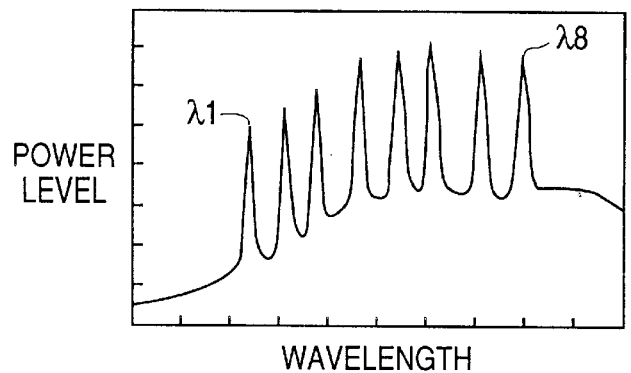
FIG. 9 is a graph illustrating a wavelength division multiplexed (WDM) signal having eight wavelength signals λ1 to λ8 multiplexed together, after being transmitted through an optical transmission system having gain-equalizing filters, according to an embodiment of the present invention.

FIG. 9 is a graph illustrating a wavelength division multiplexed (WDM) signal having eight wavelength signals $\lambda 1$ to $\lambda 8$ multiplexed together, after being transmitted through an optical transmission system having gain-equalizing filters, according to an embodiment of the present invention. Referring now to FIG. 9, the optical signal-to-noise ratios (SNRs) of all wavelength $\lambda 1$ to $\lambda 8$ is significantly increased, compared to a transmission system as illustrated in FIG. 4.

As discussed above, an optical transmission system, such as that shown in FIG. 5, includes a mixture of optical amplifier-repeaters that have gain-equalizing filters and optical amplifier-repeaters that do not have gain-equalizing filters. This type of optical transmission system requires two different types of spare optical amplifier-repeaters, one which has a gain-equalizing filter and one which does not have a gain-equalizing filter. If, for example, the system contains approximately seventy (70) repeaters, it is necessary to provide approximately three (3) spare repeaters having gain-equalizing filters and approximately two (2) spare repeaters that do not have gain-equalizing filters. This is a relatively high number of spare repeaters. As a result, the overall cost of the optical transmission system will be relatively high.

Figure 11A:
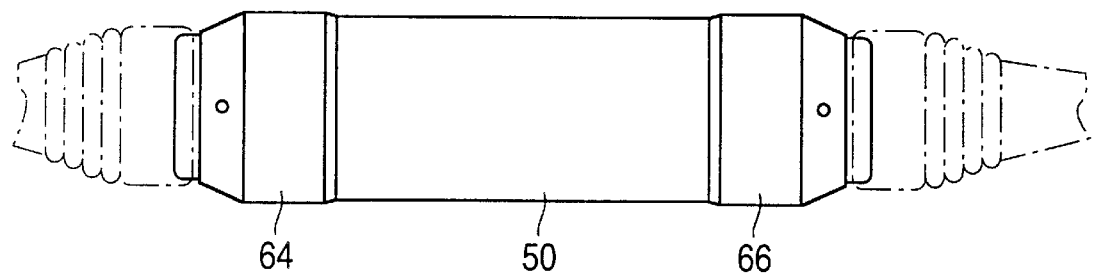
FIGS. 11(A) and 11(B) are side and cross-sectional views, respectively, of the optical amplifier-repeater in FIG. 10, according to an embodiment of the present invention.
Figure 11B:
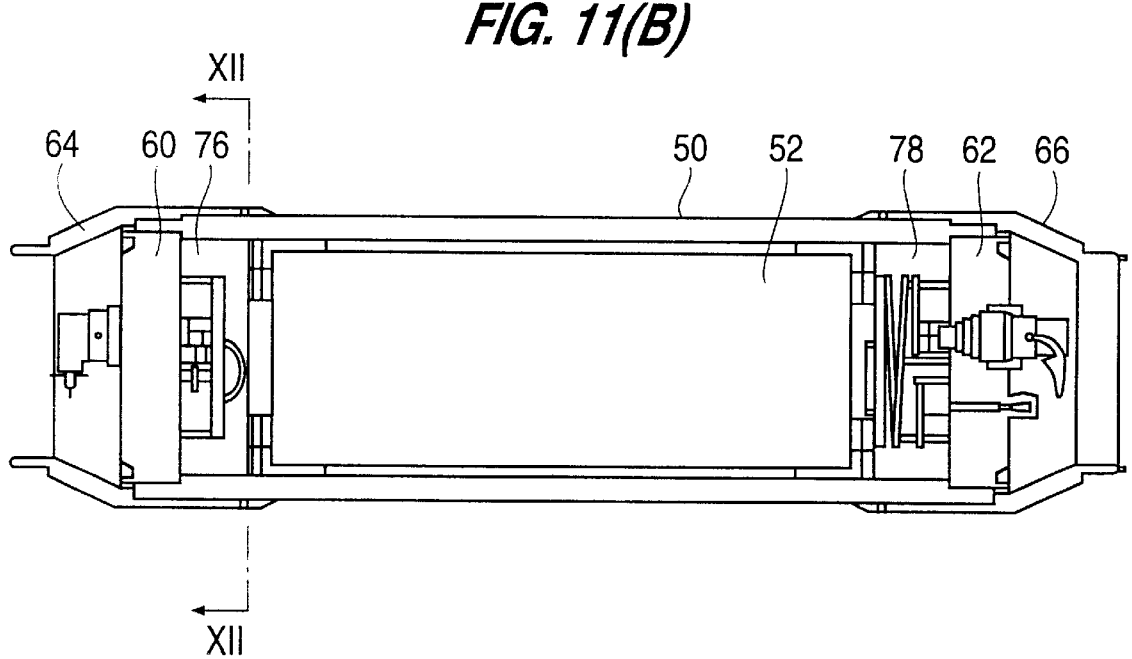

A solution to this problem is the use of a spare optical amplifier-repeater, as illustrated in FIGS. 10, 11(A) and 11(B). More specifically, FIG. 10 is a diagram illustrating an optical amplifier-repeater, according to an embodiment of the present invention. FIGS. 11(A) and 11(B) are side and cross-sectional views, respectively, of the optical amplifier-repeater in FIG. 10, according to an embodiment of the present invention.

Referring now to FIGS. 10, 11(A) and 11(B), internal unit 52 is contained in cylinder 50. Internal unit 52 includes EDFAs 54 and 56 and gain-equalizing filters 55 and 57. Cylinder 50 is sealed with cover assemblies 60 and 62 which are fitted into both ends of cylinder 50. Further, the ends of cylinder 50 are furnished with joint rings 64 and 66 that cover the cover assemblies 60 and 62.

The output of EDFA 54, and both the input and output of gain-equalizing filter 55, are carried by optical fibers drawn into a surplus-length fiber holder 78 external to internal unit 52. Similarly, the output of EDFA 56, and the input and output of gain-equalizing filter 57, are carried by optical fibers drawn into a surplus-length fiber holder 76 external to internal unit 52.

Figure 12:
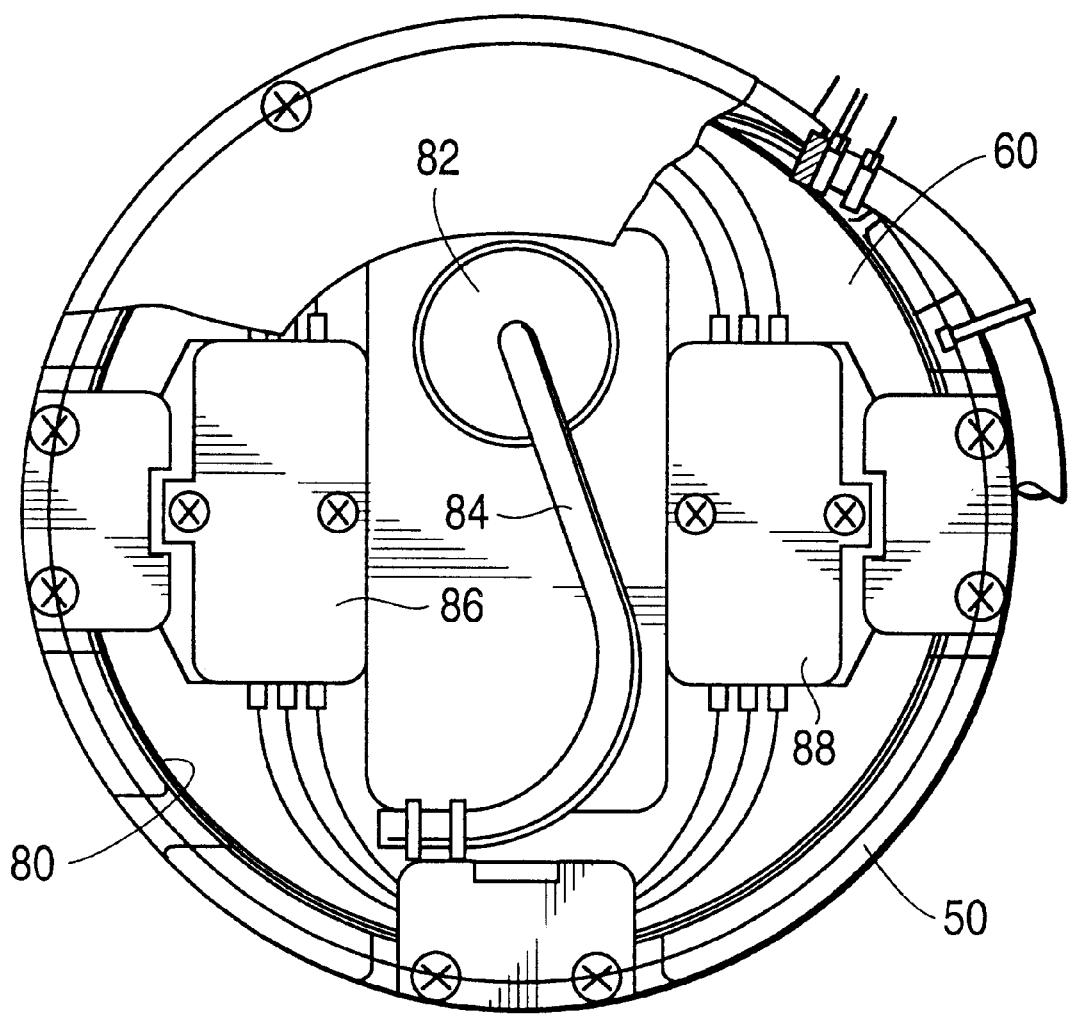
FIG. 12 is a diagram illustrating a view along the direction XII—XII in FIG. 11(B), of an optical amplifier-repeater, according to an embodiment of the present invention.

FIG. 12 is a diagram illustrating a view along the direction XII—XII in FIG. 11(B). Therefore, FIG. 12 shows surplus-length fiber holder 76 when viewed from internal unit 52.

Referring now to FIG. 12, surplus-length fiber is wound inside cylinder 50 for approximately, for example, eighty (80) turns. A field-through assembly 82 passes through cover assembly 60. An optical fiber tube 82 containing a bundle of optical fibers is introduced through field-through assembly 82 from outside cover assembly 60. For example, an optical fiber introduced from outside is spliced to an optical fiber drawn from internal unit 52. The splice is supported and fixed by support members 86 and 88.

The spare optical amplifier-repeater illustrated in FIGS. 10, 11(A) and 111(B) can be used as an optical amplifier-repeater without a gain-equalizing filter. This can be done by appropriately configuring the EDFAs and the gain-equalizing filters so that they are not optically connected together. For example, referring to FIG. 10, an optical fiber connected to the output of EDFA 54 is spliced to optical fiber 70 by surplus-length fiber holder 78, thereby bypassing gain-equalizing filter 55.

The spare optical amplifier-repeater can also be used as an optical amplifier-repeater containing gain-equalizing filters. This can be done by appropriately configuring the EDFAs and the gain-equalizing filters so that they are optically connected together. For example, referring to FIG. 10, an optical fiber connected to the output of EDFA 56 is spliced to an optical fiber connected to the input of gain-equalizing filter 57. Also, an optical fiber connected to the output of gain-equalizing filter 57 is spliced to optical fiber 74 in surplus-length fiber holder 76. As a result, optical fibers from multiple optical circuits can be selectively connected at surplus-length fiber holders 76 and 78.

Therefore, a spare optical amplifier-repeater as shown in FIG. 10 can be used with or without gain-equalizing filters. Whether or not to use the gain-equalizing filters is easily selectable by using the splices on the optical fibers in joint rings 64 and 66. In an optical transmission system that requires approximately seventy (70) repeaters, all that is needed is to provide about three of such spare optical amplifier-repeaters. This is a relatively small amount of spare repeaters, thereby reducing the complexity and cost of the optical transmission system.

Moreover, a configuration as illustrated, for example, in FIG. 7, can be used for optical amplifier-repeaters 40(n), 40(2n), . . . , 40(in) having built-in gain-equalizing filters.

Therefore, according to embodiments of the present invention as illustrated, for example, in FIGS. 10, 11(A) and 11(B), an optical repeater includes an optical amplifier, a gain equalizer and a connection mechanism. The connection mechanism has a first state and a second state so that (a) when the connection mechanism is in the first state, the gain equalizer of the optical repeater performs an equalization process on a light signal, and (b) when the connection mechanism is in the second state, the gain equalizer of the optical repeater does not perform an equalization process on the light signal. For example, in FIGS. 10, 11(A) and 11(B), surplus-length fiber holders 76 and 78 together operated as a connection mechanism to provide the first state and the second state, by allowing various fibers to be spliced together in an appropriate manner. Moreover, optical switches can be used as a connection mechanism to switch between a state where the gain equalizer and the optical amplifier are optically connected together and a state where the gain equalizer and the optical amplifier are not optically connected together.

Figure 13:
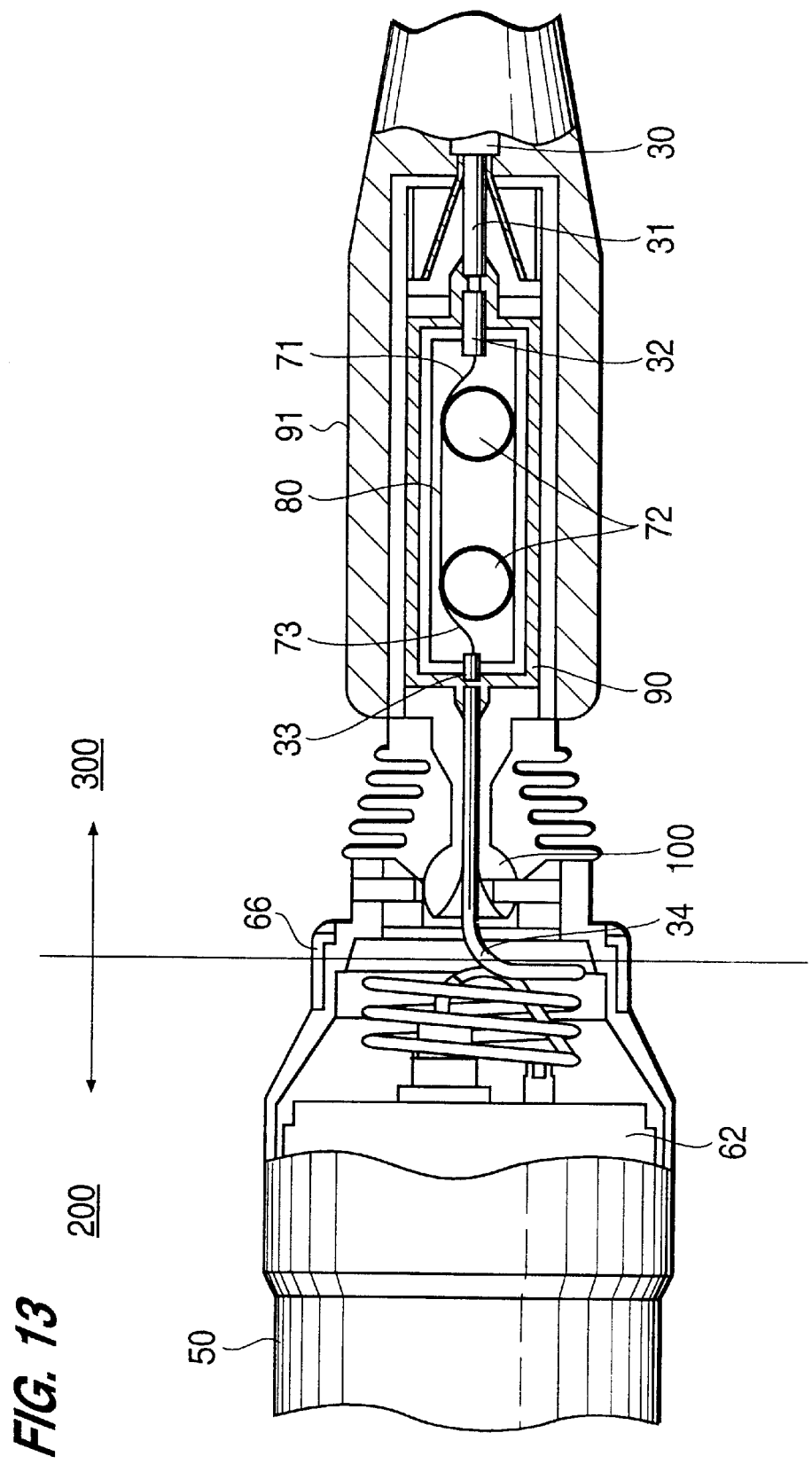
FIG. 13 is a diagram illustrating a cross-section of an optical amplifier-repeater having gain-equalizing filters, according to an additional embodiment of the present invention.

FIG. 13 is a diagram illustrating a cross-section of an optical amplifier-repeater having gain-equalizing filters, according to an additional embodiment of the present invention. In FIG. 13, optical circuits (such as optical amplifiers and gain-equalizing filters) are connected outside joint rings 64 and 66. In contrast, in FIG. 12, optical fibers from optical amplifier-repeaters and gain-equalizing filters are selectively connected in surplus-length fiber holders 64 and 66.

Referring now to FIG. 13, the optical amplifier-repeater includes a first housing 200 and a second housing 300. First housing 200 and second housing 300 are both preferably constructed to be air-tight. Cylinder 50 in first housing 200 includes an optical amplifier and a gain-equalizing filter. Optical fibers drawn out of the optical amplifier, the gain equalizer, and other optical components included in cylinder 50 are led to second housing 300 by a feeder 34 laid out in the form of a pipeline.

Second housing 300 includes a coupling 91, a universal joint 100 providing a link between first housing 200 and second housing 300, and a polyethylene housing 90 having a surplus-length optical fiber holder which can accommodate the surplus post-connection lengths of the optical fibers. A joint ring 66 joins first housing 200 to second housing 300.

Polyethylene housing 90 contains a surplus-length of optical fiber 80 on which a splicing point is provided so that multiple optical fibers 73 from within tube-like feeder 34 coming from first housing 200 can be selectively connected to optical fibers 71 from a submarine cable. The multiple optical fibers 73 are connected to optical circuits (such as optical amplifiers and gain-equalizing filters).

The surplus-length of optical fiber 80 on which this splicing point is provided is used to lead the output of the optical amplifier to the input of the gain equalizer, and to connect the output fiber of the gain equalizer to the optical fiber from the optical fiber cable 30. Alternatively, the surplus-length of optical fiber 80 can directly connect to the optical fiber from optical fiber cable 30 without the intervention of a gain equalizer. FIG. 13 also illustrates feeders 31, 32 and 33.

Optical amplifier-repeaters used in submarine communication systems must endure more extensive reliability tests than ground repeaters. Without the present invention, an optical communication system that contains a mixture of optical amplifier-repeaters that require gain equalizing and those that do not require gain equalizing would need two types of products for optical amplification and repeating. Testing of two types of products would also be necessary. In addition, if an optical amplifier-repeater malfunctions after it is installed underwater, it is extremely difficult to determine whether it is equipped with gain equalizers. Therefore, it would be necessary to provide both types of spare amplifier-repeaters for each installed amplifier-repeater.

In contrast, the above embodiments of the present invention allows the first and second housings to be manufactured in advance so that the gain-equalizing filter can be connected as necessary, thus contributing to improved manufacturing.

The above embodiments of the present invention use the same structure for several types of optical amplifier-repeaters regardless of whether they are equipped with gain-equalizing filters. As a consequence, the number of spare components required after submarine installation is reduced by sharing the same type of repeater. The resulting equipment is thus cost-effective.

The following embodiment of the present invention demonstrates that the usefulness of the present invention is not limited to optical repeaters that perform optical amplification and gain equalization.

Figure 14:
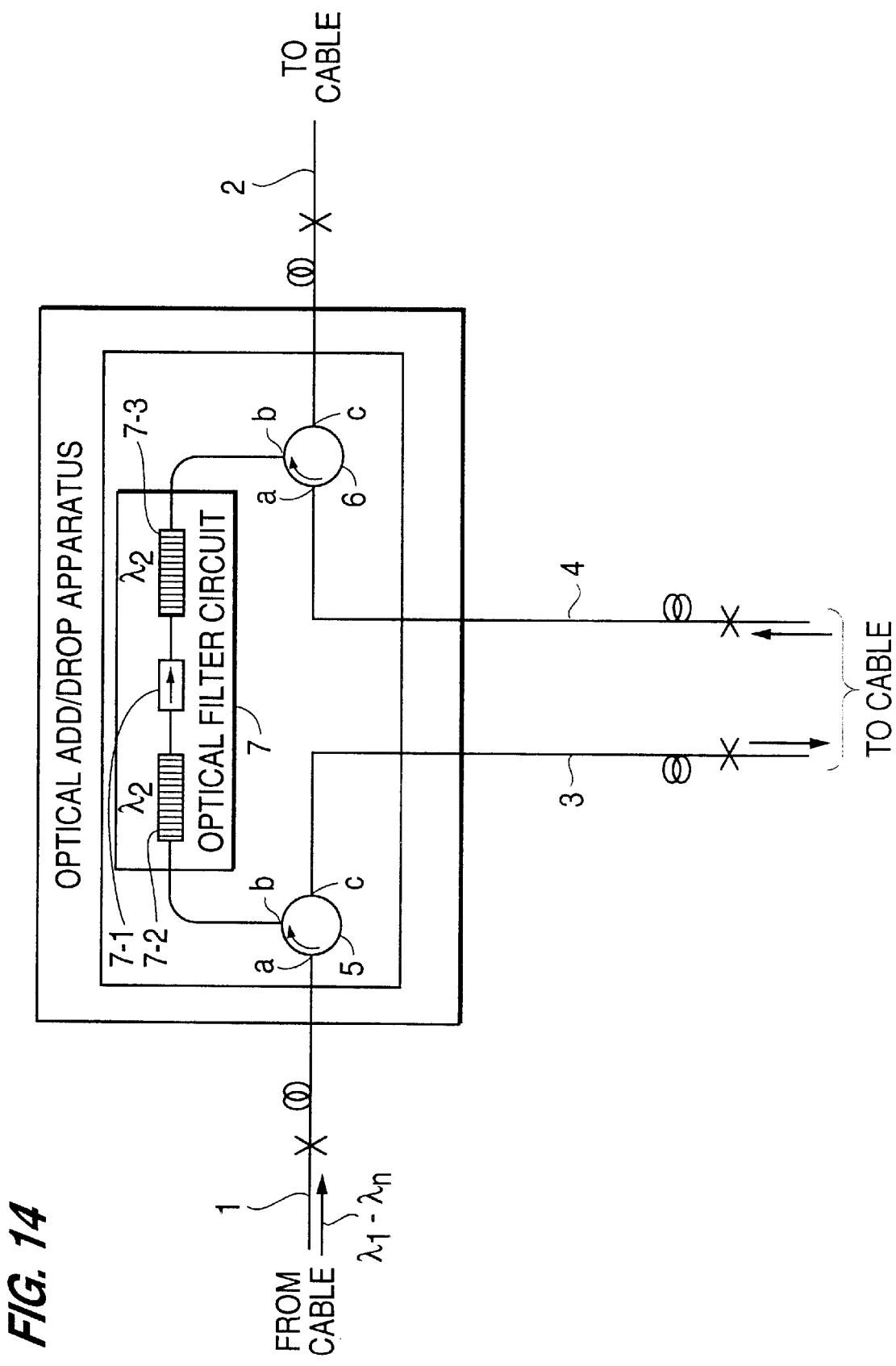
FIG. 14 is a diagram illustrating an add/drop apparatus which performs optical add/drop processing.

FIG. 14 is a diagram illustrating an add/drop apparatus which performs optical add/drop processing. Referring now to FIG. 14, the apparatus includes an input optical fiber 1 to receive a WDM signal, and an output optical fiber 2 to output the WDM signal after add/drop processing. An optical fiber 3 is to output a dropped wavelength signal to an add/drop terminal. An optical fiber 4 is to receive a new wavelength signal from the add/drop terminal. An optical filter circuit 7 includes an optical isolator 7-1, a first fiber grating filter 7-2 and a second fiber grating filter 7-3. A first optical circulator 5 and a second optical circulator 6 are for directing various optical signals to the proper destination. Generally, first and second optical circulators 5 and 6 cyclically pass light in only one direction. An "X" mark denotes a splice, and indicates a connecting point between a cable and the add/drop apparatus.

A WDM signal is received from a first terminal (not illustrated) through optical fiber 1. The WDM signal comprises optical signals (also referred to herein as "wavelength signals") with different wavelengths. Optical filter circuit 7 isolates certain wavelengths from the WDM signal. Moreover, optical filter 7 can multiplex certain wavelengths from the add/drop terminal to the WDM signal.

Therefore, multiple wavelength signals from the first terminal are wavelength-multiplexed to a single WDM signal that is delivered to the optical add/drop apparatus through optical fiber 1. The WDM signal goes through the path from a to b of optical circulator 5 and is fed to filter circuit 7.

When the WDM signal is passed through filter circuit 7, only the wavelength signal with the wavelength to be sent to the add/drop terminal is reflected by first fiber grating filter 7-2. This reflected wavelength signal then travels through the path from b to c of first optical circulator 5, and is delivered to the add/drop terminal through optical fiber 3.

A new wavelength signal with the selected wavelength from the add/drop terminal is delivered to the add/drop apparatus through optical fiber 4. This new wavelength signals travels through the path from a to b of optical circulator 6 and is delivered to filter circuit 7.

The new wavelength signal is then reflected by second fiber grating filter 7-3 in filter circuit 7, combined with the WDM signal passing through optical isolator 7-1 in filter circuit 7, then delivered to a second terminal (not illustrated) through optical fiber 2.

Figure 15:
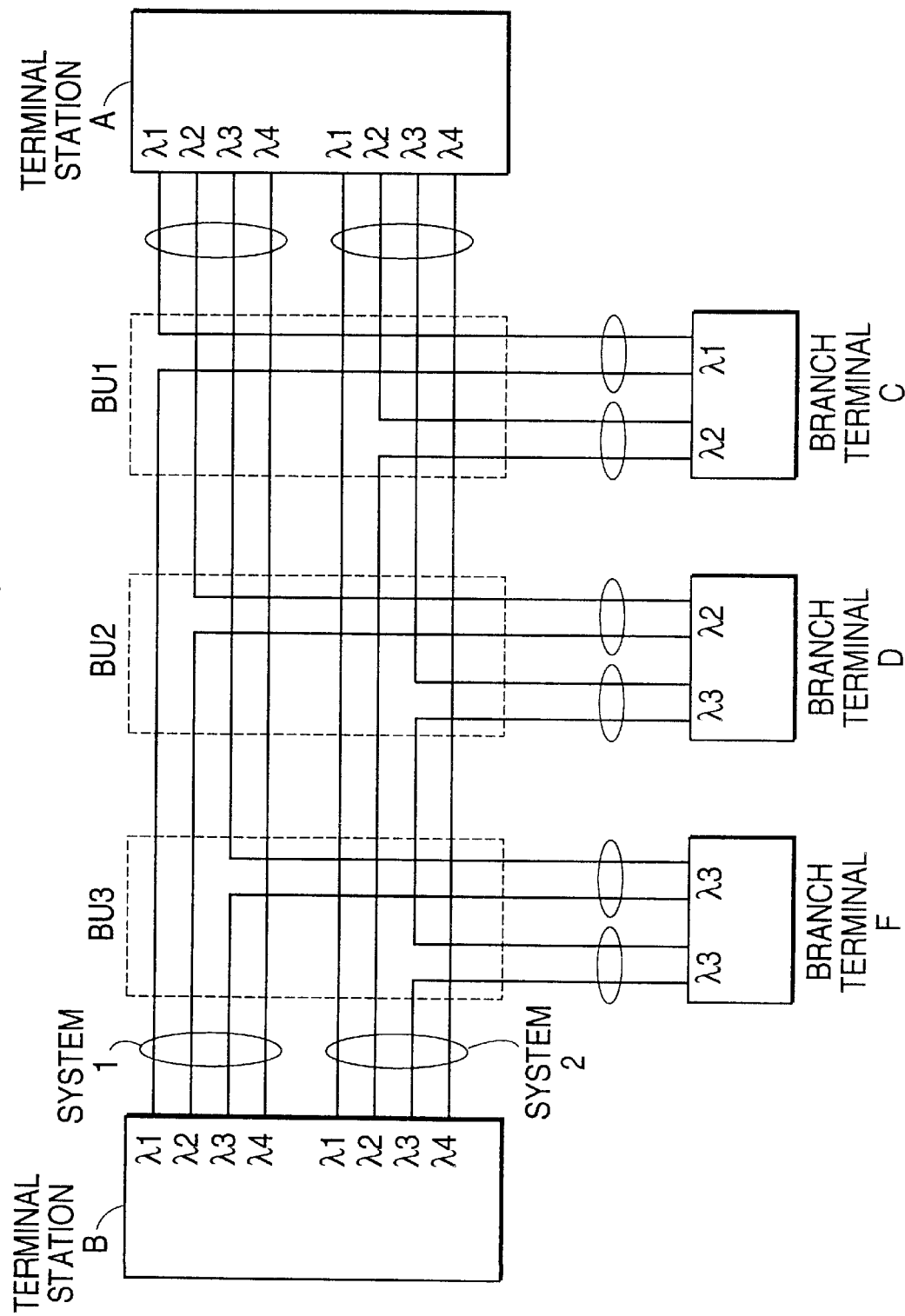
FIG. 15 is a diagram illustrating an optical communication system utilizing add/drop apparatuses.

FIG. 15 is a diagram illustrating an optical communication system utilizing add/drop apparatuses. Referring now to FIG. 15, systems 1 and 2 transmit WDM signals between terminal stations A and B. Each WDM signal includes four wavelength signals at wavelengths $\lambda 1$ to $\lambda 4$, respectively. Add/drop terminals C, D and F receive dropped wavelength signals and provide new wavelength signals, and require the use of three add/drop apparatuses BU1 to BU3.

Assume that each add/drop apparatus BU1 to BU3 is configured as illustrated in FIG. 14. In this case, to distribute wavelength signals of different wavelengths to add/drop terminals C to F, one type of add/drop apparatus must be manufactured and provided for each wavelength because each add/drop apparatus includes an optical filter that can handle only one wavelength. If systems 1 and 2 have wavelength signals of different wavelengths to be added/dropped, the number of types of optical add/drop apparatuses will be further increased.

An increased number of types of optical add/drop apparatuses raises other problems. For example, to prepare for failures, one spare add/drop apparatus must be provided for maintenance purposes for each type of add/drop apparatus being used. Therefore, a very large number of spare add/drop apparatuses will be required. For example, for the optical communication system in FIG. 15, three spare add/drop apparatuses are needed because the layout contains three add/drop apparatuses being used.

In addition, different components must be manufactured for different types of add/drop apparatuses and different tests must be conducted for each type. This introduces a problem regarding manufacturing practices.

A solution to these problems is to standardize the structures of the optical add/drop apparatuses used in an optical transmission system that transmits WDM signals over optical fibers between first and second terminals. This minimizes the number of spare optical add/drop apparatuses required, thus contributing to an improvement in system maintainability.

Figure 16:
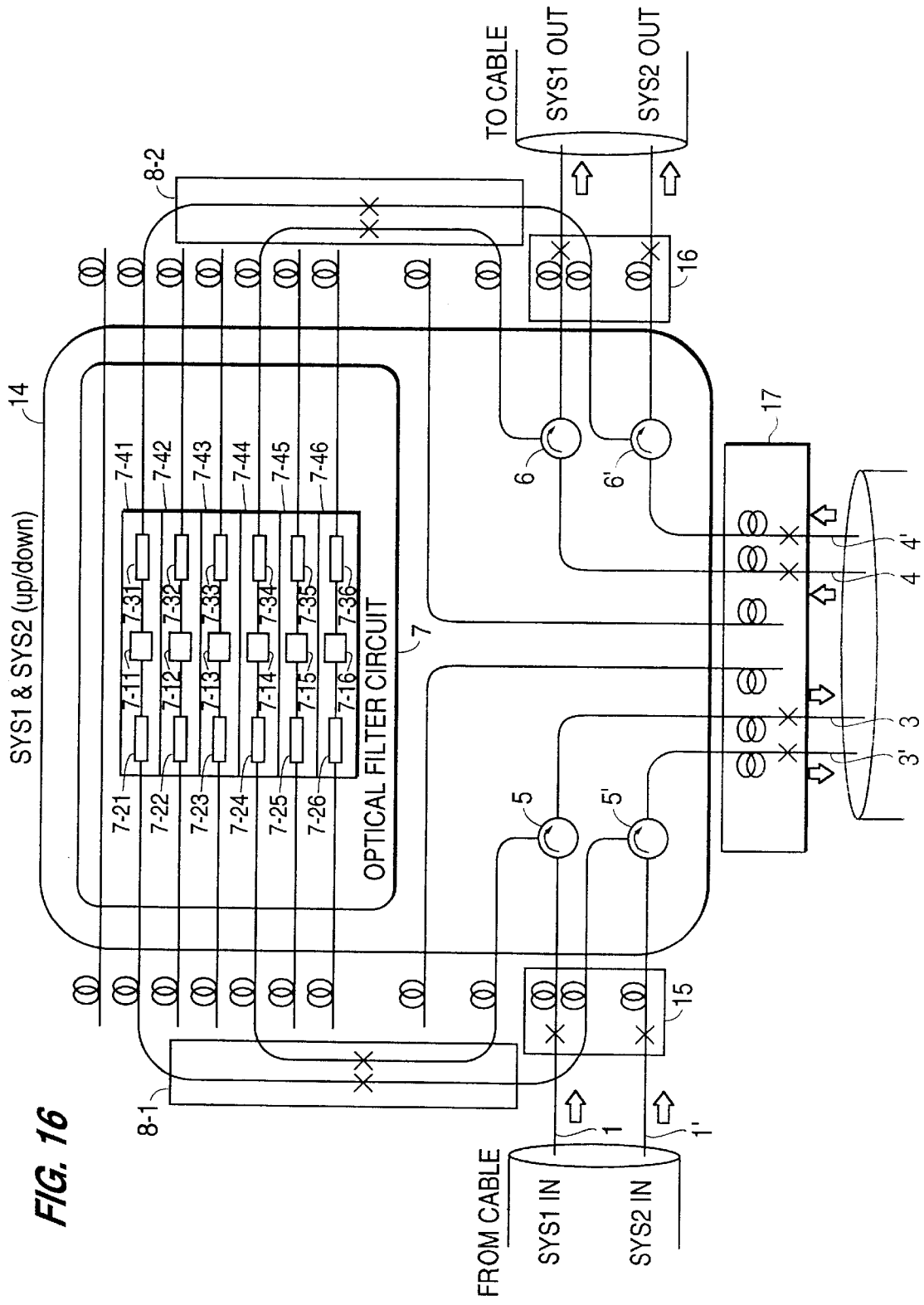
FIG. 16 is a diagram illustrating an add/drop apparatus, according to an embodiment of the present invention.

For example, FIG. 16 is a diagram illustrating an add/drop apparatus, according to an embodiment of the present invention. This add/drop apparatus provides a standard configuration which can be used to add/drop many different wavelength signals from a WDM signal.

Referring now to FIG. 16, WDM signals are received on input optical fibers 1 and 1' for system 1 (SYS1) and system 2 (SYS2), respectively. Add/drop processed WDM signals are output for systems 1 and 2 on output optical fibers 2 and 2', respectively. Optical fibers 3 and 3' are to output dropped wavelength signals from systems 1 and 2, respectively, to the add/drop terminal. Optical fibers 4 and 4' are to receive new wavelength signals for systems 1 and 2, respectively, from the add/drop terminal.

An optical filter circuit 7 includes optical filters 7-41 to 7-46. Each optical filter 7-41 to 7-46 includes a first fiber grating filter, a second fiber grating filter and an optical isolator. For example, as illustrated in FIG. 16, optical filters 7-41 to 7-46 include input fiber grating filters 7-21 to 7-26, respectively. Optical filters 7-41 to 7-46 include output fiber grating filters 7-31 to 7-36, respectively. Optical filters 7-41 to 7-46 include optical isolators 7-11 to 7-16, respectively.

First optical circulator 5 and second optical circulator 6 direct the various optical signals. The apparatus also includes an input link 8-1, an output link 8-2, an equipment housing 14, an input port 15, an output port 16 and an add/drop port 17. An "X" mark denotes a splice.

In the example illustrated in FIG. 16, optical filter circuit 7 includes optical filters 7-41 to 7-46 which each reflect only wavelength signals with certain wavelengths out of multiple wavelengths ($\lambda 1$ to $\lambda 6$). Generally, optical filter circuit 7 should included optical filters to cover all the wavelengths in an optical communication system which may be subject to add/drop processing. Therefore, in FIG. 16, optical filter circuit 7 includes optical filters 7-41 to 7-46 to cover the wavelengths $\lambda 1$ to $\lambda 6$, respectively, that are subject to add/drop processing within the system.

Light with wavelength $\lambda 1$ is reflected by input fiber grating filter 7-21 and output fiber grating filter 7-31 in optical filter 7-41. Light with wavelength $\lambda 2$ is reflected by input fiber grating filter 7-22 and output fiber grating filter 7-32 in optical filter 7-42. Light with wavelength $\lambda 3$ is reflected by input fiber grating filter 7-23 and output fiber grating filter 7-33 in optical filter 7-43. Light with wavelength $\lambda 4$ is reflected by input fiber grating filter 7-24 and output fiber grating filter 7-34 in optical filter 7-44. Light with wavelength $\lambda 5$ is reflected by input fiber grating filter 7-25 and output fiber grating filter 7-35 in optical filter 7-45.

Light with wavelength $\lambda 6$ is reflected by input fiber grating filter 7-26 and output fiber grating filter 7-36 in optical filter 7-46.

The input/output fibers and through-fibers on optical filters 7-41 to 7-46 and the input/output fibers on optical circulators 5 and 6 or optical circulators 5' and 6' are laid out so that they can be connected to the optical fibers from the optical circulators when they reach input link 8-1 or output link 8-2 provided outside equipment housing 14.

FIG. 15 illustrated optical circulators 5 and 6 being optically connected to optical filter 7-44, and optical circulators 5' and 6' being optically connected to optical filter 7-41. Therefore, the WDM signal from optical fiber 1 of system 1 in the cable is fed to optical circulator 5 via input port 15. The WDM signal from optical circulator 5 is fed to optical filter 7-44 in filter circuit 7 via input link 8-1.

The wavelength signal with wavelength $\lambda 4$ is reflected by fiber grating filter 7-24 in optical filter 7-44, is fed to optical circulator 5 via input link 8-1, passes through add/drop port 17, and is then delivered to the add/drop terminal via optical fiber 3.

The optical signal with the selected wavelength from the add/drop terminal is fed to add/drop port 17 via optical fiber 4.

The optical signal fed to add/drop port 17 passes through optical circulator 6 and is delivered to optical filter 7-44 in optical filter circuit 7.

The wavelength signal with wavelength $\lambda 4$ fed to optical filter 7-44 is reflected by output fiber grating filter 7-34, combined with the WDM signal having passed through optical isolator 7-14 in optical filter 7-44, is fed to optical fiber 2, then sent to the second terminal.

The optical signal from the add/drop terminal may be a WDM signal resulting from the wavelength multiplexing of waves with different wavelengths from the WDM signal in optical fiber 1. In this case, however, the wavelength of the wavelength signal reflected by the output fiber grating filter must match the wavelength of the optical signal from the add/drop terminal.

In optical filter 7-44, wavelength signals having wavelengths unequal to $\lambda 4$ pass through input fiber grating filter 7-24, optical isolator 7-14, and output fiber grating filter 7-34, and are then output from the apparatus.

Therefore, all the optical add/drop apparatuses in the system can be fabricated with the same design if connections are selectively made from optical circulators 5 and 6 and the optical filters within optical filter circuit 7. These connections can be made in input link 8-1 and output link 8-2. An add/drop apparatus as in FIG. 16 can be used for each of the add/drop apparatuses BU1 to BU3 in FIG. 15.

In FIG. 16, system 2 is connected to optical filter 7-1. Therefore, regarding a WDM signal travelling in System 2, wavelength signals having wavelengths unequal to $\lambda 1$ pass through input fiber grating filter 7-21, optical isolator 7-11, and output fiber grating filter 7-31, and are then output from the apparatus.

Since input link 8-1, output link 8-2, input port 15, output port 16, and add/drop port 17 are provided outside the equipment housing 14, signal switching can be conducted while the circuitry inside is kept secure in the air-tight housing.

In addition, the optical fibers are spliced in input link 8-1, output link 8-2, input port 15, output port 16, and add/drop port 17. This layout solves the problem of reflection at joints.

Further, optical connectors are used to connect optical fibers to input link 8-1, output link 8-2, input port 15, output port 16, and add/drop port 17. This facilitates modification to the connections within input link 8-1 and output link 8-2.

In FIG. 16, system 1 uses optical fibers 1 and 2 and System 2 uses optical fibers 1' and 2'. These optical fiber cables are used for the transmission of WDM signals resulting from the wavelength multiplexing of multiple wavelength signals with different wavelengths transmitted between multiple terminals.

In FIG. 16, since system 1 uses only one optical filter 7-44 and does not use other optical filters, optical filter 7-41, for example, can be used exclusively for System 2. This assures effective use of filters. Moreover, the System 1 and System 2 lines may be the inbound and outbound transmission paths, respectively, or vice versa. Further, the apparatus does not have to be configured or used for both add/drop processing. Instead, the apparatus can be configured or used for only add processing or only drop processing. Moreover, the term add/drop terminal is not intended to be limited a single, physically connected terminal. Instead, physically separated terminals can function together as an add/drop terminal. Moreover, the apparatus can be used with only an add terminal and/or a drop terminal.

Equipment housing 14 shown in FIG. 16 may be of the same structure as cylinder 50 shown in FIG. 6. Similarly, input link 8-1, output link 8-2, add/drop port 17, input port 15, and output port 16 can be connected within support members 86 and 88 contained in cover assemblies 60 and 62, as shown in FIG. 12.

Therefore, according to embodiments of the present invention as illustrated, for example, in FIG. 16, an apparatus can add/drop an individual wavelength signal from a WDM signal. The apparatus includes a plurality of filters, and a selection mechanism. Each filter affects a different wavelength. The plurality of filters includes at least one filter affecting a wavelength corresponding to a wavelength signal in the WDM signal. The selection mechanism selects a respective filter of the at least one filter to allow the apparatus to add/drop the wavelength signal in the WDM signal corresponding to the wavelength of the selected filter. For example, in FIG. 16, input link 8-1 and output link 8-2 together operate as such a selection mechanism.

Figure 17:
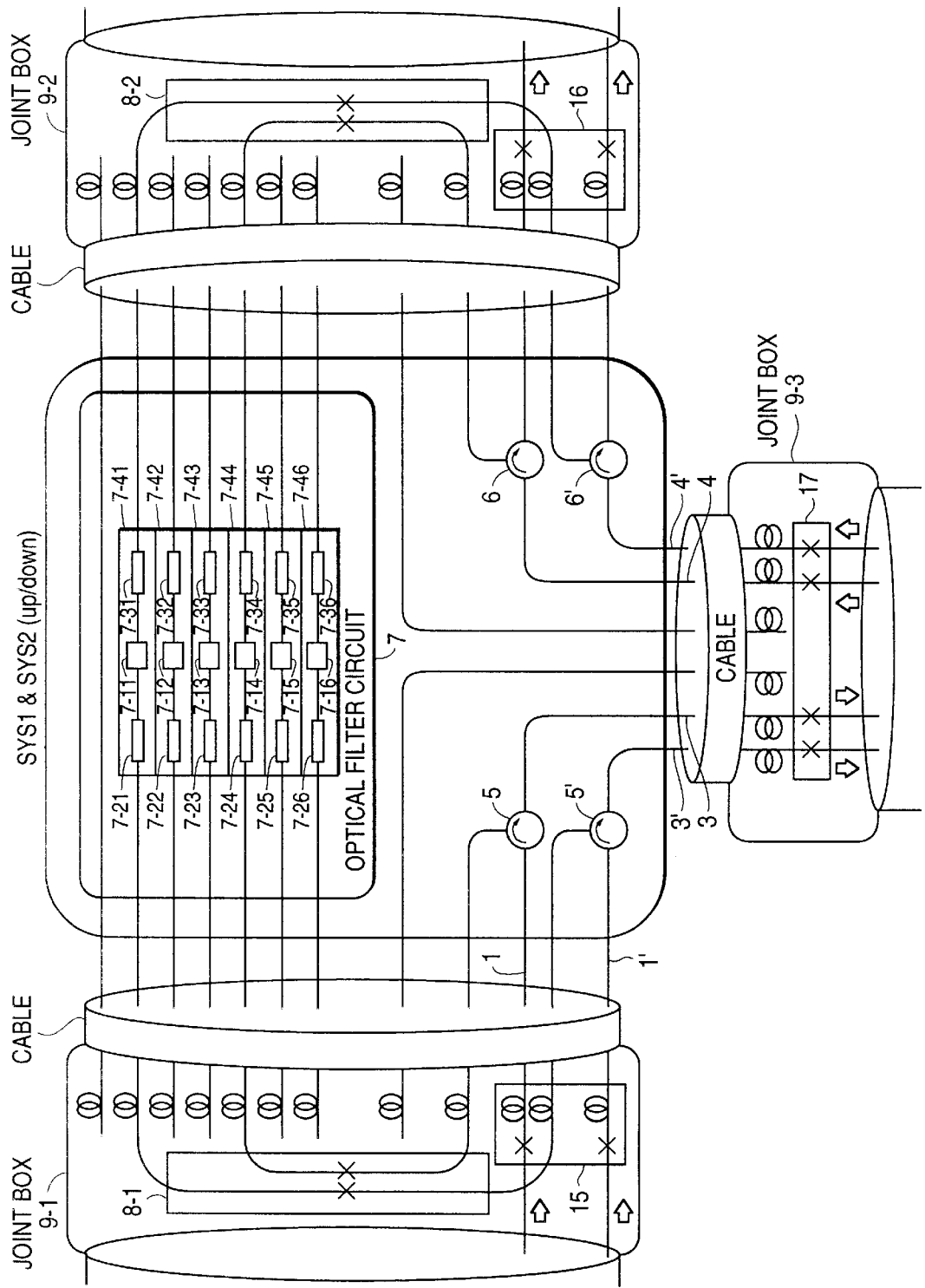
FIG. 17 is a diagram illustrating an add/drop apparatus, according to an additional embodiment of the present invention.

FIG. 17 is a diagram illustrating an add/drop apparatus, according to an additional embodiment of the present invention. Referring now to FIG. 17, joint boxes 9-1, 9-2 and 9-3 are used for inter-cable connections at the end of cables or extended optical fibers. As illustrated in FIG. 17, joint box 9-1 includes input link 8-1 and input port 15. Joint box 9-2 includes output link 8-2 and output port 16. Joint box 9-3 includes add/drop port 17. This configuration makes it possible to selectively connect optical filters 7-41 to 7-46 in optical filter circuit 7.

Joint boxes 9-1, 9-2, and 9-3 can be constructed in a similar manner as second housing 200 in FIG. 13 because the optical fibers from optical filter circuit 7 and optical circulators 5, 5', 6, and 6' are provided to the feeder in FIG. 13.

It is possible to provide joint boxes 9-1, 9-2, and 9-3 outside the add/drop apparatus by treating the fibers from optical filter circuit 7 and the optical fibers from optical circulators 5, 5', 6, and 6', as cables. Therefore, the equipment can be built so that joint boxes 9-1, 9-2, and 9-3 are provided in optical repeaters which are located before or after the optical add/drop apparatus.

The present embodiment of the present invention is designed so that a spare optical add/drop apparatus can be stored in the condition that any cumbersome coupling has already been completed. All that must be done at the time of use is to switch connections on the optical filter circuit by simply reconnecting the optical fibers in the joint boxes. In the configuration shown in FIG. 17, it is preferable to use splicing or optical connectors at the connections.

Figure 18:
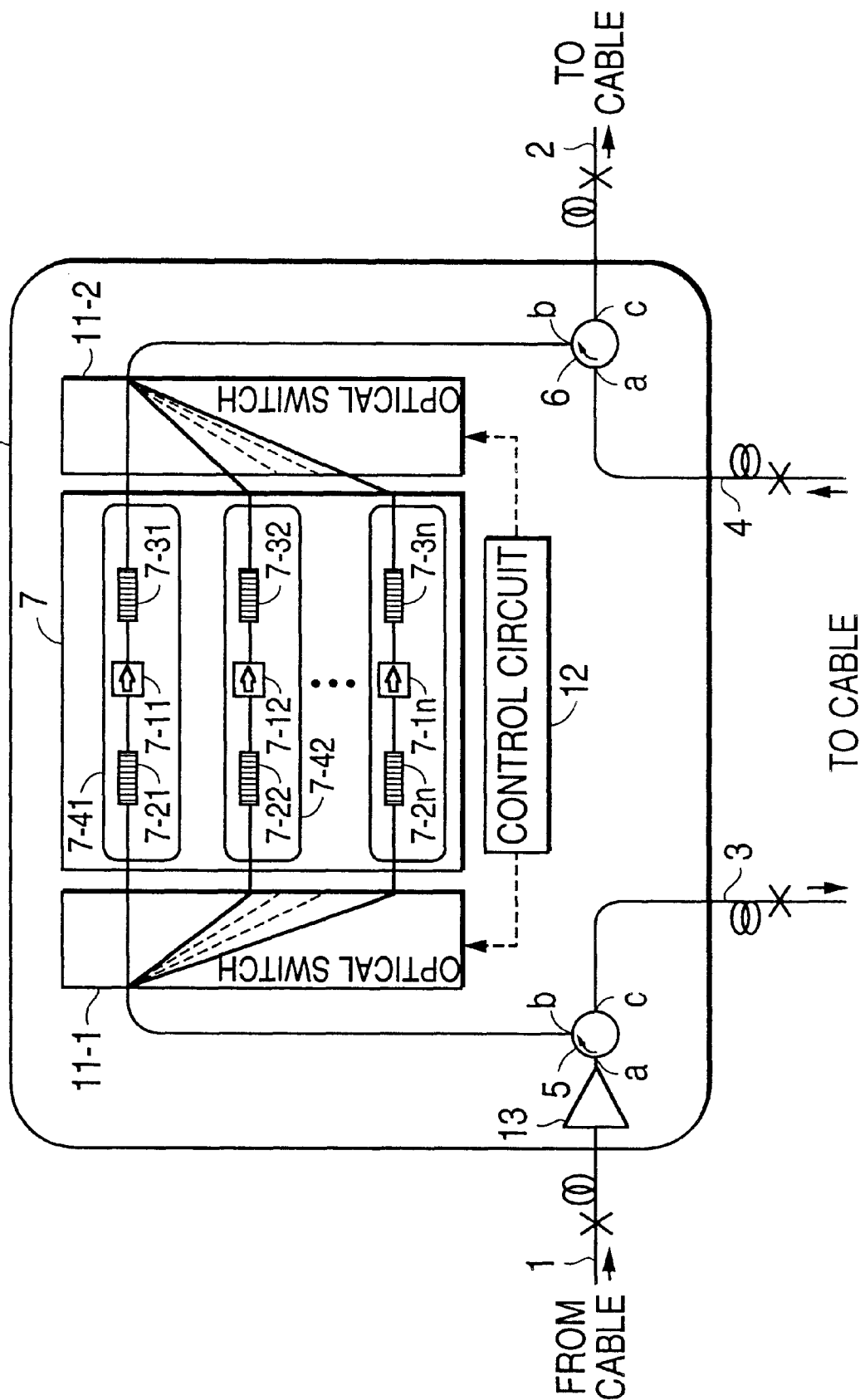
FIG. 18 is a diagram illustrating an add/drop apparatus, according to a further embodiment of the present invention.

FIG. 18 is a diagram illustrating an add/drop apparatus, according to a further embodiment of the present invention. Referring now to FIG. 18, optical switches 11-1 and 11-2 and control circuit 12 are used to select an appropriate optical filters 7-41 to 7-4n.

Optical filters 7-41 to 7-4n can extract wavelength signals with specific wavelengths from the WDM signal resulting from the wavelength multiplexing of multiple optical wavelength signals, and can combine wavelength signals having specific wavelengths. Optical circulators 5 and 6 cyclically pass optical signals only in one direction. Optical switches 11-1 and 11-2 change connections between optical circulators 5 and 6 and optical filters 7-41 to 7-4n. An optical amplifier 13 amplifies the WDM signal received into the apparatus. Control circuit 12 controls switching of optical switches 11-1 and 11-2.

Therefore, a WDM signal from the first terminal is fed to the apparatus via optical fiber 1. The WDM signal then travels through a path from a to b of optical circulator 5 and is fed to optical filter circuit 7 via optical switch 11-1.

Of all the wavelength signals, only the wavelength signal with the wavelength to be sent to the add/drop terminal is reflected by a certain optical filter, such as optical filter 7-41, in optical filter circuit 7. This reflected wavelength signal then travels along a path from b to c of optical circulator 5, and is delivered to the add/drop terminal.

A control signal is sent from control circuit 12 to change the wavelength to be chosen or change optical switches 11-1 and/or 11-2 from the first or second terminal. By sending this signal, control circuit 12 changes optical switches 11-1 and 11-2 to choose the wavelength signal with the desired wavelength.

Control circuit 12 preferably relies on monitoring/control signals being sent from the terminals connected to the add/drop apparatus, to change optical switches 11-1 and 11-2.

Therefore, according to embodiments of the present invention as illustrated, for example, in FIG. 18, an apparatus can add/drop an individual wavelength signal from a WDM signal. The apparatus includes a plurality of filters, and a selection mechanism. Each filter affects a different wavelength. The plurality of filters includes at least one filter affecting a wavelength corresponding to a wavelength signal in the WDM signal. The selection mechanism selects a respective filter of the at least one filter to allow the apparatus to add/drop the wavelength signal in the WDM signal corresponding to the wavelength of the selected filter. For example, in FIG. 18, optical switch 11-1, optical switch 11-2 and control circuit 12 together operate as such a selection mechanism.

According to the above embodiments of the present invention, an optical filter processes an optical signal by reflecting at least a portion of the optical signal. For example, in FIG. 16, optical fibers 7-41 to 7-46 include fiber grating filters which reflect light. However, the present invention is not intended to be limited to filters which reflect light, and other types of filtering mechanism can be used to appropriately process light signals.

According to the above embodiments of the present invention, an add/drop apparatus contains multiple optical filters. It also contains optical switches, an optical amplifier, and control circuits to select the appropriate optical filter. This causes the internal structure of the apparatus to be relatively large, complex, and energy-consuming. However, it is advantageous in that change-over at the time of failure can be performed under control from terminals.

The above description refers to various optical fibers or optical elements as being "optically connected" together. The term "optically connected" is intended to refer to a connection where various fibers or optical elements are connected together so that an optical signal can be transferred through the fibers, or processed by the optical elements. Therefore, for example, if a gain equalizer is "optically connected" to an optical amplifier, a WDM signal can be amplified by the optical amplifier and then travel to the gain equalizer for equalization processing. If the gain equalizer is not "optically connected" to the optical amplifier, the gain equalizer could be considered to be "off-line" so as not to affect the WDM signal.

Although a few preferred embodiments of the present invention have been shown and described, it would be appreciated by those skilled in the art that changes may be made in these embodiments without departing from the principles and spirit of the invention, the scope of which is defined in the claims and their equivalents.

What is claimed is:

1. An optical transmission system comprising:
   an optical fiber transmission line;
   a plurality of optical repeaters arranged along the transmission line; and
   a plurality of gain equalizers, each gain equalizer being arranged along the transmission line after an integer number of optical repeaters, each gain equalizer equalizing the gain of upstream optical repeaters, wherein each optical repeater includes
   a gain equalizer, and
   a connection mechanism having a first state and a second state so that
      when the connection mechanism is in the first state, the gain equalizer of the optical repeater equalizes the gain of upstream optical repeaters, and when the connection mechanism is in the second state, the gain equalizer of the optical repeater does not equalize the gain of upstream optical repeaters, the connection mechanism of each optical repeater being in either the first state or the second state to provide the plurality of gain equalizers arranged along the transmission line.

2. An optical transmission system comprising:
   an optical fiber transmission line;
   a plurality of optical repeaters arranged along the transmission line; and
   a plurality of gain equalizers, each gain equalizer being arranged along the transmission line after an integer number of optical repeaters, each gain equalizer equalizing the gain of upstream optical repeaters, wherein each optical repeater comprises
   an optical amplifier which amplifies a light signal travelling along the transmission line and through the optical repeater,
   a gain equalizer, and
   a connection mechanism having a first state and a second state so that
      when the connection mechanism is in the first state, the gain equalizer of the optical repeater equalizes the gain of upstream optical repeaters, and
      when the connection mechanism is in the second state, the gain equalizer of the optical repeater does not equalize the gain of upstream optical repeaters, the connection mechanism of each optical repeater being in either the first state or the second state to provide the plurality of gain equalizers arranged along the transmission line.

3. An optical transmission system as in claim 2, wherein, in each optical repeater,
   when the connection mechanism is in the first state, the gain equalizer of the optical repeater is optically connected to the transmission line so that the light signal travelling along the transmission line and through the optical repeater also travels through the gain equalizer, and
   when the connection mechanism is in the second state, the gain equalizer of the optical repeater is not optically connected to the transmission line.

4. An optical repeater, comprising:
   an optical amplifier which amplifies a light signal;
   a gain equalizer; and
   a connection mechanism having a first state and a second state so that
      when the connection mechanism is in the first state, the gain equalizer of the optical repeater performs an equalization process on the light signal, and
      when the connection mechanism is in the second state, the gain equalizer of the optical repeater does not perform an equalization process on the light signal.

5. An optical repeater as in claim 4, wherein,
   when the connection mechanism is in the first state, the gain equalizer is optically connected to optical amplifier, and
   when the connection mechanism is in the second state, the gain equalizer is not optically connected to the optical amplifier.

6. An optical repeater as in claim 4, further comprising:
   a first housing which houses the optical amplifier and the gain equalizer of the optical repeater; and
   a second housing which houses the connection mechanism, the first and second housings being airtight.

7. An optical transmission system comprising:
   an optical fiber transmission line;
   a plurality of optical repeaters arranged along the transmission line, each optical repeater including
   a gain equalizer, and
   a connection mechanism having a first state and a second state so that
      when the connection mechanism is in the first state, the gain equalizer of the optical repeater equalizes the gain of upstream optical repeaters, and
      when the connection mechanism is in the second state, the gain equalizer of the optical repeater does not equalize the gain of upstream optical repeaters, the connection mechanism of each optical repeater being in either the first state or the second state to provide a plurality of gain equalizers arranged along the transmission line, each gain equalizer being arranged along the transmission line after an integer number of optical repeaters.

8. An optical transmission system comprising:
   an optical fiber transmission line;
   a plurality of optical repeaters arranged along the transmission line, each optical repeater including
   an optical amplifier which amplifies a light signal travelling along the transmission line and through the optical repeater, a gain equalizer, and a connection mechanism having a first state and a second state so that when the connection mechanism is in the first state, the gain equalizer of the optical repeater equalizes the gain of upstream optical repeaters, and when the connection mechanism is in the second state, the gain equalizer of the optical repeater does not equalize the gain of upstream optical repeaters, the connection mechanism of each optical repeater being in either the first state or the second state to provide a plurality of gain equalizers arranged along the transmission line, each gain equalizer being arranged along the transmission line after an integer number of optical repeaters.

* * * * *